UNITED STATES PATENT OFFICE.

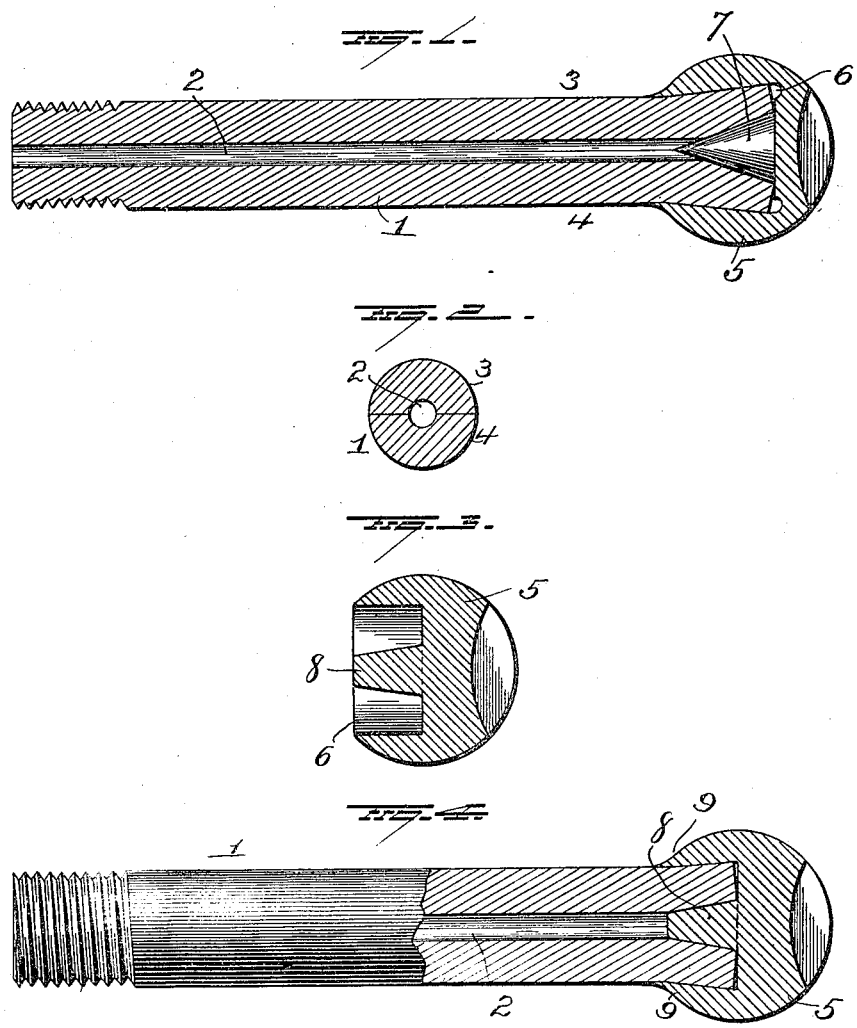

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT FOR BOILERS.

1,281,328.      Specification of Letters Patent.      Patented Oct. 15, 1918.

Application filed February 21, 1917. Serial No. 150,201.

*To all whom it may concern:*

Be it known that we, JOHN R. FLANNERY and ETHAN I. DODDS, citizens of the United States, and residents of Pittsburgh, in the county of Allegheny and State of Pennsylvania, have invented certain new and useful Improvements in Stay-Bolts for Boilers; and we do hereby declare the following to be a full, clear, and exact description of the invention, such as will enable others skilled in the art to which it appertains to make and use the same.

This invention relates to improvements in staybolts for boilers and more particularly to that type known in the art as "flexible staybolts for boilers",—one object of the invention being to so apply the spherical or partly spherical bearing head to the bolt body, as to facilitate the application of a bearing head to a two-part welded body portion having a longitudinal bore without contracting said bore during the act of locating the head on the bolt body, and to also close the end of the bore at the headed outer end of the bolt.

With this and other objects in view, the invention consists in certain novel features of construction and combinations of parts as hereinafter set forth and pointed out in the claims.

In the accompanying drawings; Figure 1 is a longitudinal sectional view of a staybolt showing an embodiment of our invention; Fig. 2 is a cross section of the same, and Figs. 3 and 4 are views illustrating a modification.

1 represents the body of a staybolt having a longitudinal bore 2 extending through the same from end to end. The bolt body 1 may comprise two mating members 3—4 welded together and so shaped as to provide the central bore 2 which, in the finished bolt, forms the tell-tale hole and which latter may be made to extend continuously from the inner end of the bolt to a point within the headed outer end of the bolt, where it is closed, as hereinafter more fully explained.

A spherical or partly spherical bearing head is made separate from the body of the bolt and secured to the outer end of the latter. In the present instance we have shown a head 5 which is spherical in form. This head is provided with a socket 6, the wall of which is made somewhat tapering toward its open end. The head 5 is provided within its socket 6, with a conical projection or wedge 7 disposed centrally within said socket and having its base or larger end preferably made integral or otherwise rigid with the base of the socket, or the cone 7 may be made separate from the head, if desired.

In applying the spherical bearing head 5 to the outer end of the bolt body, the end of the latter is caused to enter the socket 6 and the cone is caused to enter the outer end of the bore 2. As the head and bolt body are now forced together, the cone 7 will operate to expand the metal at the outer end of the bolt body and press the same into conformity with the tapering contour of the socket 6, thus securely uniting the spherical head to the bolt body, and said cone also serves to permanently close the outer end of the bore 2 within the headed outer end of the bolt, leaving said bore continuous from the inner end of said cone to the inner end of the bolt.

If desired the wedge or projection within the head 5, may be made in the form of a truncated cone 8, as shown in Figs. 3 and 4, and instead of making the socket 6 with a tapering wall, said socket may be made cylindrical as shown in Fig. 3, and the peripheral portion 9 of the head which surrounds said socket may be pressed into conformity with the expanded end of the bolt body, as illustrated in Fig. 4.

Having fully described our invention what we claim as new and desire to secure by Letter-Patent, is:—

1. A staybolt comprising a body having a central bore, a separate head constituting a permanent part of the bolt and having a socket receiving one end of the bolt body, and a wedge within said socketed head projecting into the bore of said body and rigidly securing the head on the end of the body.

2. A stay bolt comprising a tubular body and a separate head, said head having a tapering socket and the end of the body of the bolt being flaring within said socket, and a wedge in said socketed head entering the bore of the flaring end of the bolt body.

3. A staybolt comprising a body having a bore extending through the same from end to end, a head having a socket receiving the outer end of said body, and a conical member within said socketed head and entering the outer end of the bore in said body.

In testimony whereof, we have signed this specification in the presence of two subscribing witnesses.

JOHN ROGERS FLANNERY.
ETHAN I. DODDS.

Witnesses:
F. H. ALLISON,
EDWIN S. RYCE.